(12) United States Patent
Chen

(10) Patent No.: US 8,123,241 B1
(45) Date of Patent: Feb. 28, 2012

(54) FOLDABLE BABY TRAILER

(76) Inventor: Tzu-Hsuan Chen, Taipei (TW)

( * ) Notice: Subject to any disclaimer, the term of this patent is extended or adjusted under 35 U.S.C. 154(b) by 381 days.

(21) Appl. No.: 12/605,944

(22) Filed: Oct. 26, 2009

(51) Int. Cl.
*B62K 27/00* (2006.01)

(52) U.S. Cl. ......................... 280/204; 280/639

(58) Field of Classification Search ............ 280/639, 280/204, 651, 648, 644, 656, 658, 647, 292, 280/486, 47.34
See application file for complete search history.

(56) References Cited

U.S. PATENT DOCUMENTS

| | | | |
|---|---|---|---|
| 5,785,333 A * | 7/1998 | Hinkston et al. | 280/204 |
| 5,829,770 A * | 11/1998 | Chiu | 280/204 |
| 5,829,771 A * | 11/1998 | Hsu | 280/204 |
| 5,921,571 A * | 7/1999 | Bell | 280/204 |
| 5,984,332 A * | 11/1999 | Beaudoin et al. | 280/204 |
| 6,053,518 A * | 4/2000 | Chiu | 280/204 |
| 6,896,275 B1 * | 5/2005 | Liu | 280/204 |
| 6,959,938 B1 * | 11/2005 | Liu | 280/204 |
| 6,991,249 B2 * | 1/2006 | Shapiro | 280/648 |
| 7,172,206 B2 * | 2/2007 | Staszak | 280/204 |
| 7,354,058 B2 * | 4/2008 | Chou | 280/651 |
| 7,445,222 B2 * | 11/2008 | Bell | 280/204 |

* cited by examiner

*Primary Examiner* — Hau Phan
(74) *Attorney, Agent, or Firm* — Jackson IPG PLLC; Demian K. Jackson

(57) ABSTRACT

A foldable baby trailer formed of a bottom frame unit, a trailer bar, a rear upright frame, a handle frame, and a folding control mechanism, two side frame bars and a stretcher frame is disclosed. The stretcher frame that supports a fabric seat panel for the sitting of a baby is held in a sloping position with the transverse front tube thereof spaced above the bottom frame unit at a distance so that when a baby is sitting on the fabric seat panel, the legs of the baby will not touch the ground, avoiding an accident and assuring high level of safety. When turning the handle frame backwardly downwards after pressed the operating button of the folding control mechanism, the foldable baby trailer is collapsed, saving storage space.

2 Claims, 9 Drawing Sheets

US 8,123,241 B1

FOLDABLE BABY TRAILER

BACKGROUND OF THE INVENTION

1. Field of the Invention

The present invention relates to a baby trailer and more particularly, to a foldable baby trailer that holds the fabric seat panel in a backwardly downwardly sloping position, assuring a high level of safety.

2. Description of the Related Art

Many folding collapsible baby trailers are commercially available. However, these folding collapsible baby trailers may be unable to keep the legs of the baby carried therein from touching the ground when the baby trailer is moving. FIG. 1 illustrates the frame structure of a folding collapsible baby trailer 9. When wishing to collapse the folding collapsible baby trailer 9, the two connectors 911 and 912 of the stretcher bar 91 must be respectively detached from the left upright side frame 92 and the right upright frame 93 so that the left upright side frame 92 and the right upright frame 93 can be respectively turned downwards and closely received to the bottom frame 90. This collapsing procedure is complicated. Further, when a baby is sitting on the seat panel (not shown) that is suspending in the bottom frame 90 between the left upright side frame 92 and the right upright frame 93, the legs of the baby may touch the ground, causing an accident.

SUMMARY OF THE INVENTION

The present invention has been accomplished under the circumstances in view. It is one object of the present invention to provide a foldable baby trailer, which can easily be set between the received collapsed status and the extended operative status. It is another object of the present invention to provide a foldable baby trailer, which assures a high level of safety. It is still another object of the present invention to provide a foldable baby trailer, which saves much storage space when collapsed, facilitating delivery and packing.

To achieve these and other objects of the present invention, the foldable baby trailer is comprised of a bottom frame unit, a trailer bar, a rear upright frame, a handle frame, and a folding control mechanism, two side frame bars and a stretcher frame is disclosed. The stretcher frame that supports a fabric seat panel for the sitting of a baby is held in a sloping position with the transverse front tube thereof spaced above the bottom frame unit at a distance so that when a baby is sitting on the fabric seat panel, the legs of the baby will not touch the ground, avoiding an accident and assuring high level of safety. When turning the handle frame backwardly downwards after pressed the operating button of the folding control mechanism, the rear upright frame, the side frame bars and the stretcher frame are turned forwardly downwards and closely received to the top side of the bottom frame unit, saving storage space.

DETAILED DESCRIPTION OF THE INVENTION

Figure 1:
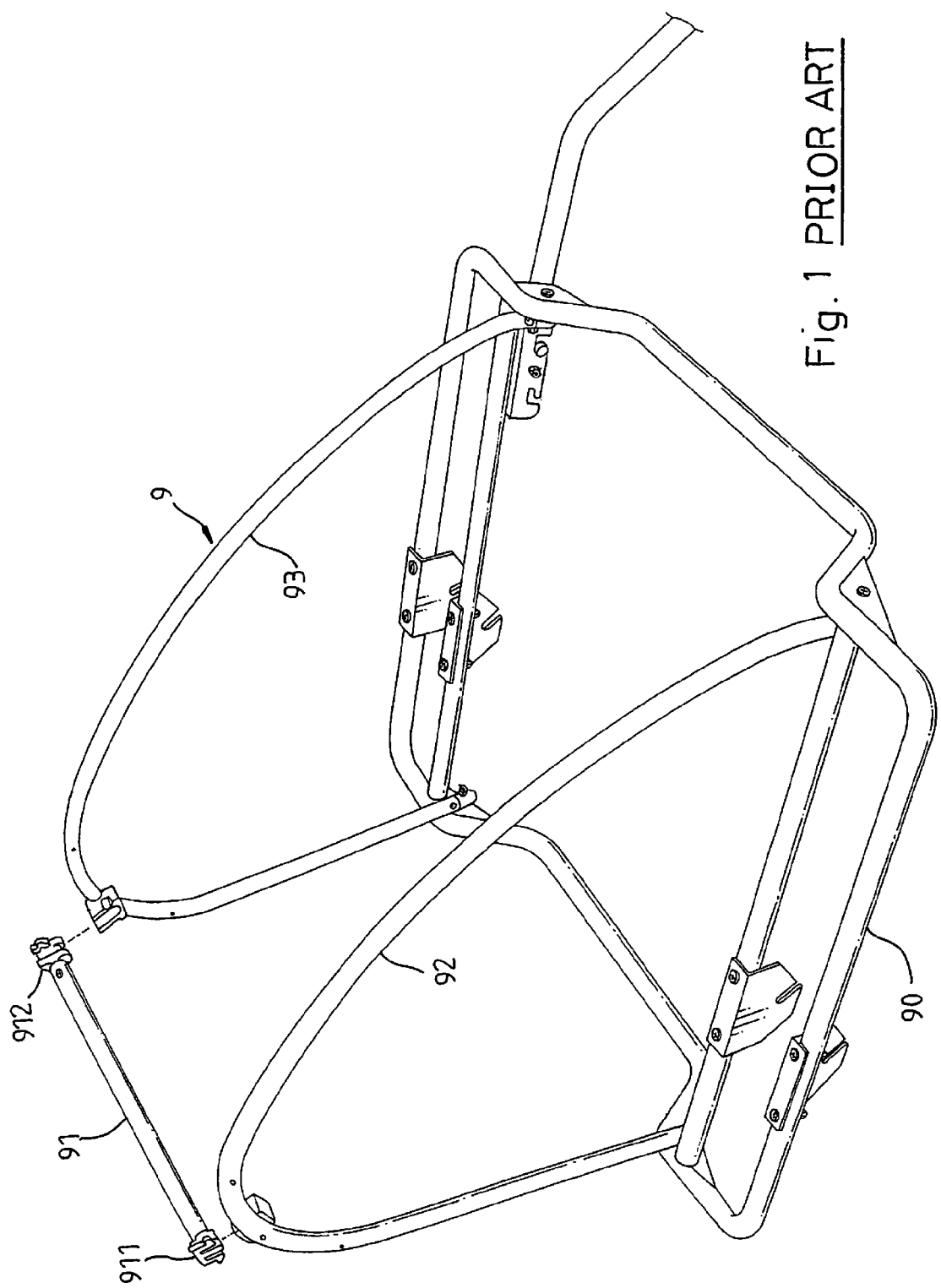
FIG. 1 is perspective view of a frame structure for baby trailer according to the prior art.
Figure 2:
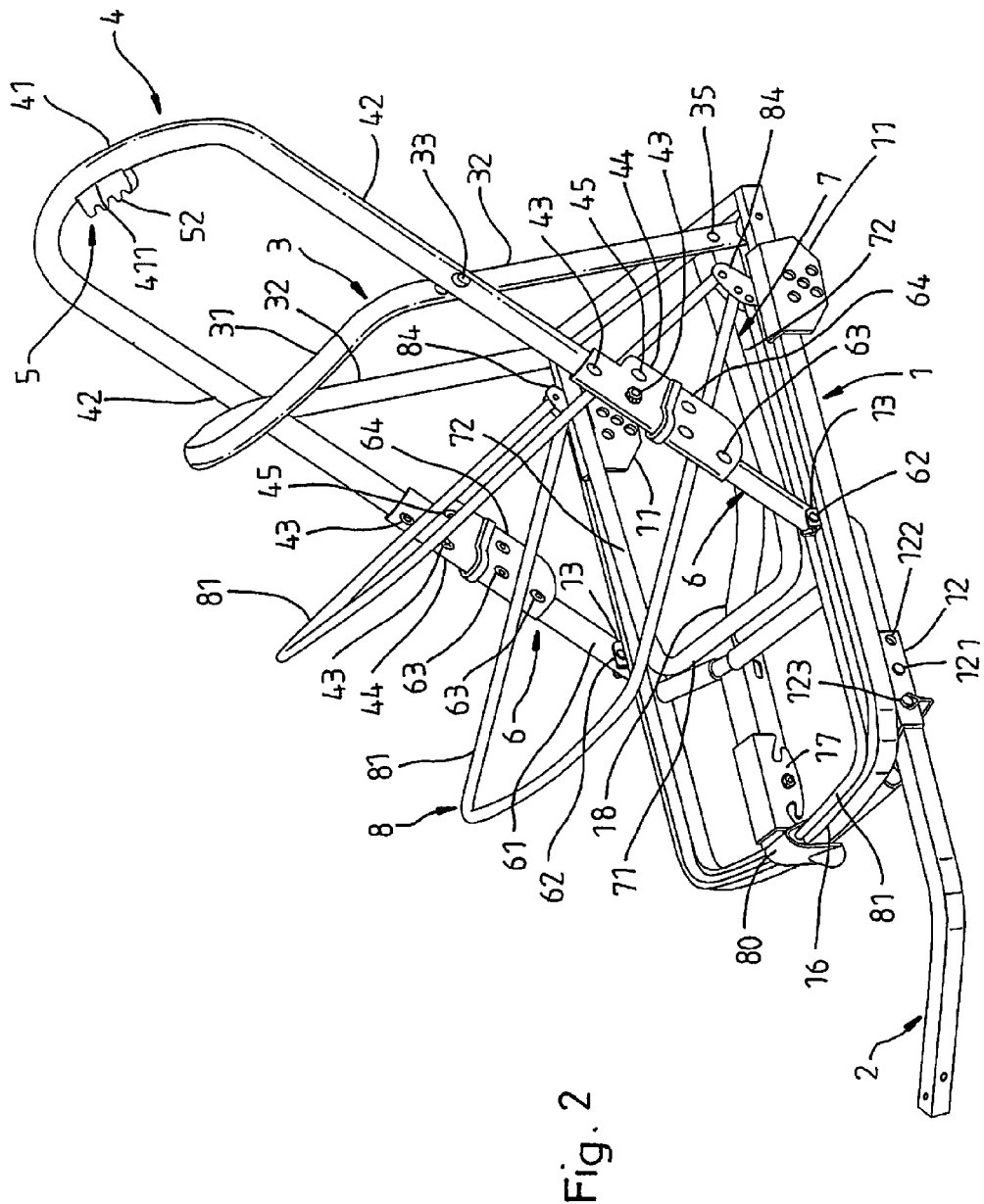
FIG. 2 is a perspective view of the frame structure of a foldable baby trailer according to the present invention.

Referring to FIGS. 2-9, a foldable baby trailer is shown comprising a bottom frame unit 1, a trailer bar 2, a rear upright frame 3, a handle frame 4, and a folding control mechanism 5, two side frame bars 6 and a stretcher frame 7.

The bottom frame unit 1 comprises two rear wheel holders 11 bilaterally located on the rear side thereof and carrying a respective wheel (bnot shown), and a bottom channel bar 12 longitudinally disposed at the bottom wall of one lateral side thereof, and two top lugs 13 respectively located on the middle of the top wall of each of the two opposite lateral sides thereof. The bottom channel bar 12 has two pairs of pin holes 122 respectively disposed near the front and rear sides thereof and transversely cut through the two opposite lateral sidewalls thereof.

The trailer bar 2 has the rear end thereof pivotally connected to a middle part of the bottom channel bar 12 of the bottom frame unit 1 with a pivot 121. Therefore, the trailer bar 2 can be turned bout the pivot 121 between the extended position shown in FIG. 4 and the received position shown in FIG. 8. The trailer bar 2 further has a pin hole (not shown) spaced from the rear end at a distance corresponding to the distance between the pivot 121 and one pair of pin holes 122 of the channel bar 12. A lock pin 123 is inserted through the front or rear pair of pin holes 122 of the channel bar 12 and the pin hole of the trailer bar 2 to lock the trailer bar 2 to the bottom frame unit 1 in the extended or received position.

The rear upright frame 3 comprises a transverse top rod 31, and two vertical side frame tubes 32 respectively downwardly extending from the two distal ends of the transverse top rod 31 and respectively pivoted to the two opposite lateral sides of the bottom frame unit 1 near the rear side of the bottom frame unit 1 with a respective pivot 34.

The handle frame 4 comprises a tubular top grip 41 and two side frame tubes 42 respectively extended from the two distal ends of the tubular top grip 41 in a substantially parallel manner. The tubular top grip 41 has an opening 411 on the middle. The two side frame tubes 42 of the handle frame 4 have a respective upper part respectively pivoted to the top ends of the vertical side frame tubes 32 of the rear upright frame 3 with a respective pivot 33 and a respective bottom end fixedly mounted with a respective upper holder frame plate 44 by means of fastening devices 43 (see FIG. 3). Each upper holder frame plate 44 has two opposite sidewalls 441 and a groove 442 defined between the sidewalls 441 for receiving the associating side frame tube 42 (see FIG. 8).

The folding control mechanism 5 comprises two latches 51 (see FIG. 8), two spring members (not shown), two cord members (not shown), and an operating button 52. The latches 51 are respectively mounted in the side frame tubes 42 of the handle frame 4. The two spring members of the folding control mechanism 5 are respectively mounted in the side frame tubes 42 of the handle frame 4 to impart a downward pressure to the respective latches 51, forcing the respective latches 51 out of the respective bottom ends 422 of the side frame tubes 42 of the handle frame 4. The operating button 52 is mounted in the opening 411 at the tubular top grip 41 of the handle frame 4. The two cord members of the folding control mechanism 5 are respectively inserted through the side frame tubes 42 of the handle frame 4 and connected between the operating button 52 and the latches 51. When pressed the operating button 52, the cord members are moved to pull the latches 51 backwards toward the inside of the side frame tubes 42 of the handle frame 4.

Figure 3:
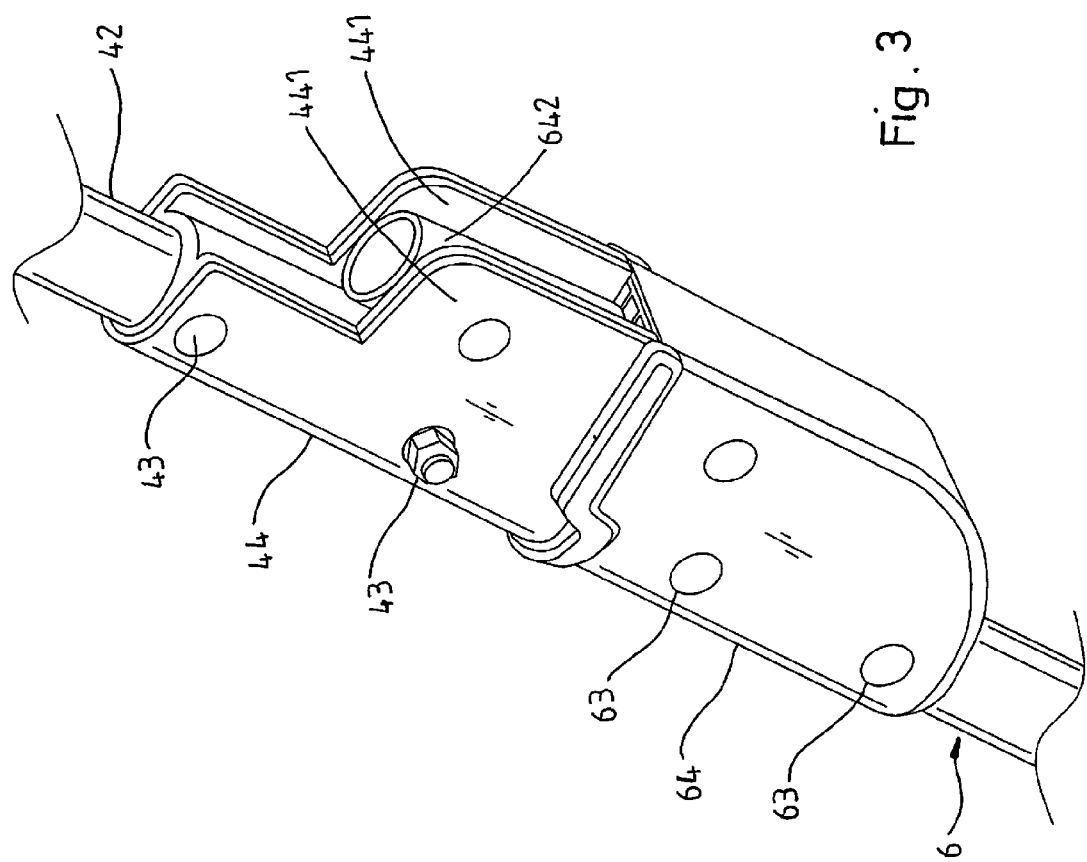
FIG. 3 is an exploded view of a part of the frame structure of the foldable baby trailer according to the present invention.
Figure 4:
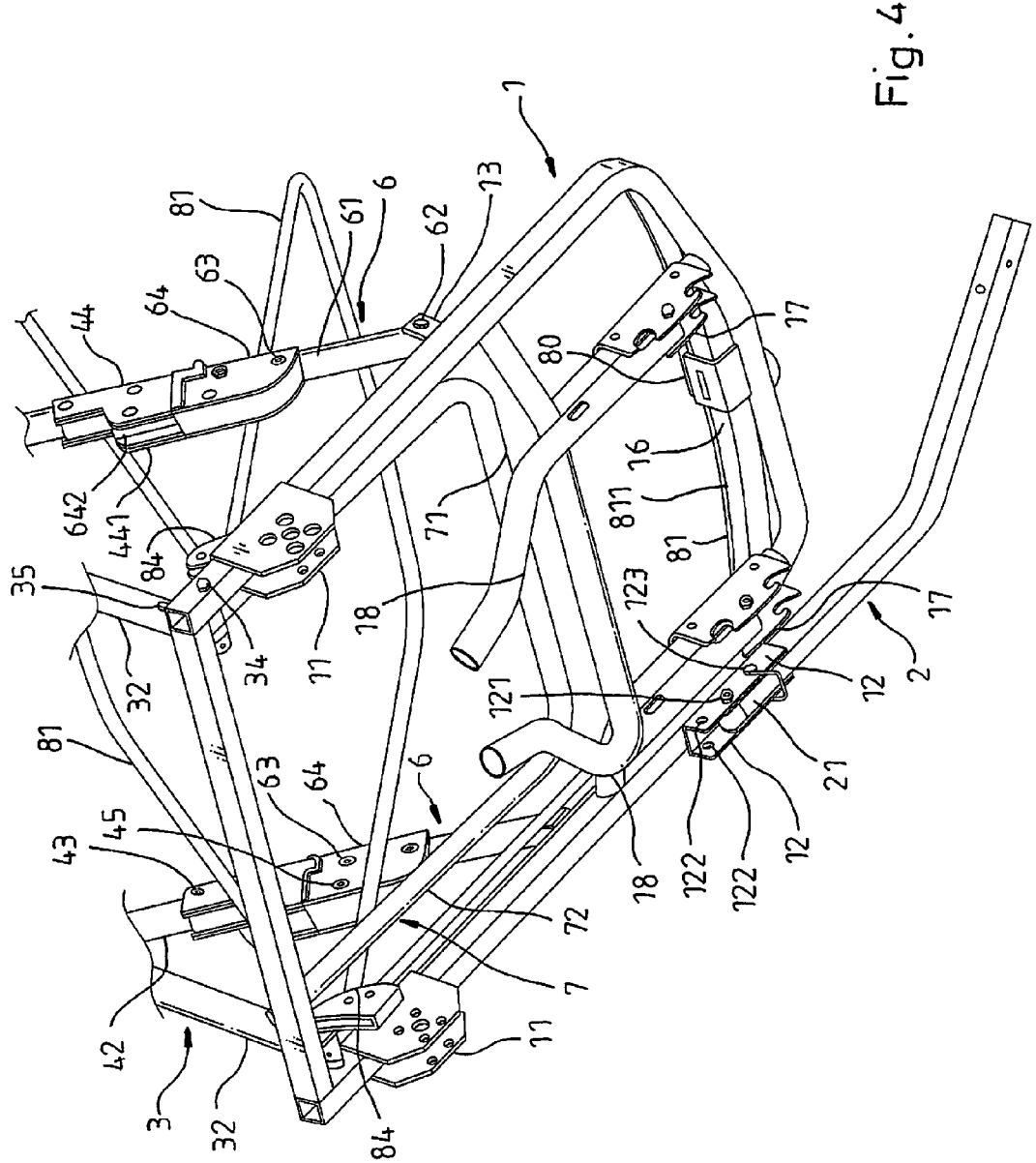
FIG. 4 is an oblique bottom view in an enlarged scale of a part of the frame structure of the foldable baby trailer according to the present invention.

The side frame bars 6 have the respective bottom ends 61 respectively pivotally connected to the two top lugs 13 of the bottom frame unit 1 with a respective pivot 62 (see FIG. 4), and a respective top end fixedly mounted with a respective lower holder frame plate 64 by means of fastening devices 63 (see FIG. 3). The lower holder frame plate 64 has a latch hole 641 (see FIG. 8) for receiving one latch 51 of the folding control mechanism 5, and a connection rod 642 fixedly connected to and extended out of the top side thereof. The connection rod 642 is pivotally connected to the upper holder frame plate 44 at one side frame tube 42 of the handle frame 4 with a pivot 45.

Figure 6:
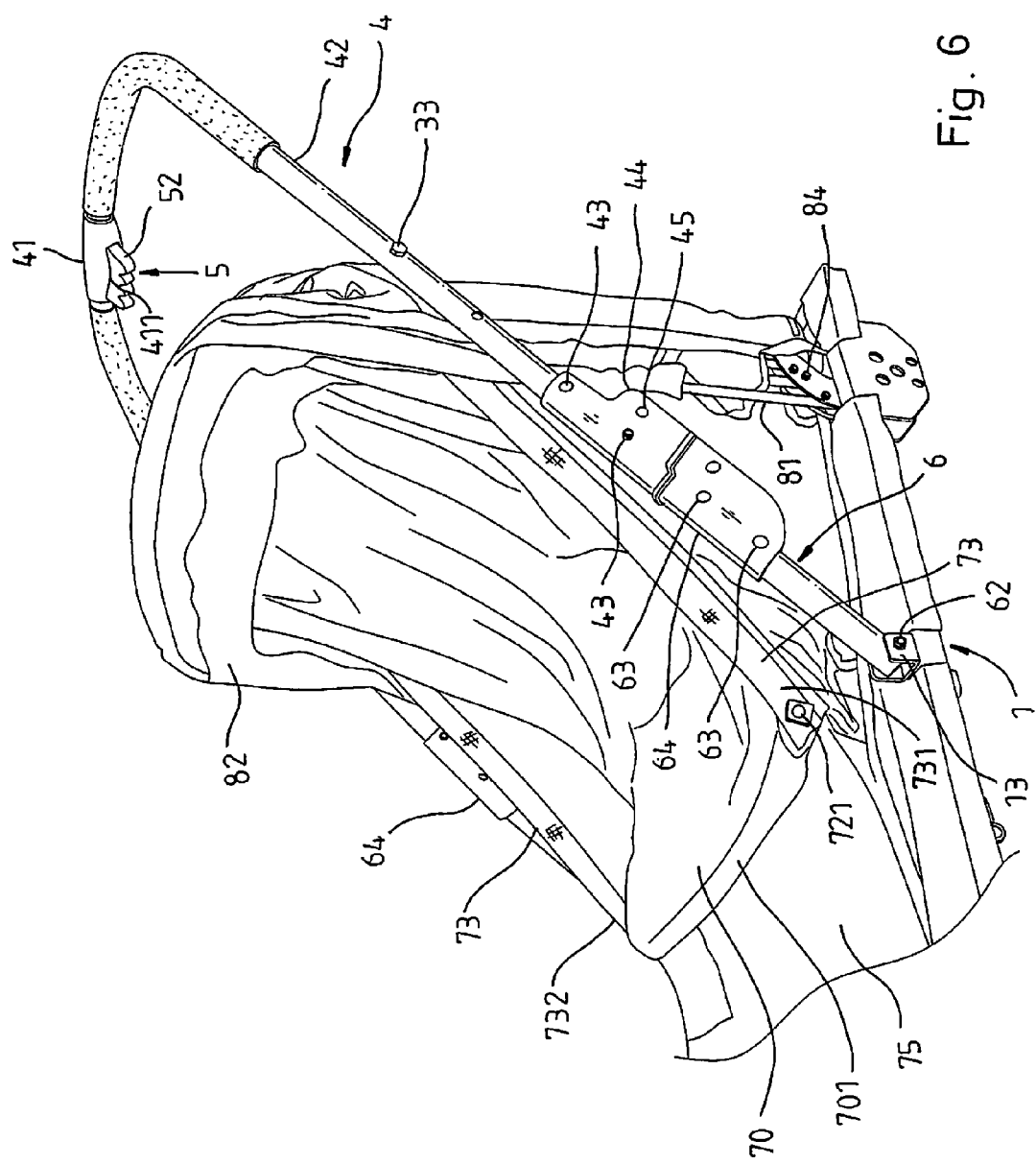
FIG. 6 corresponds to FIG. 5, showing the U-shaped canopy frame elements of the canopy unit received together and closely attached to the rear upright frame.
Figure 7:
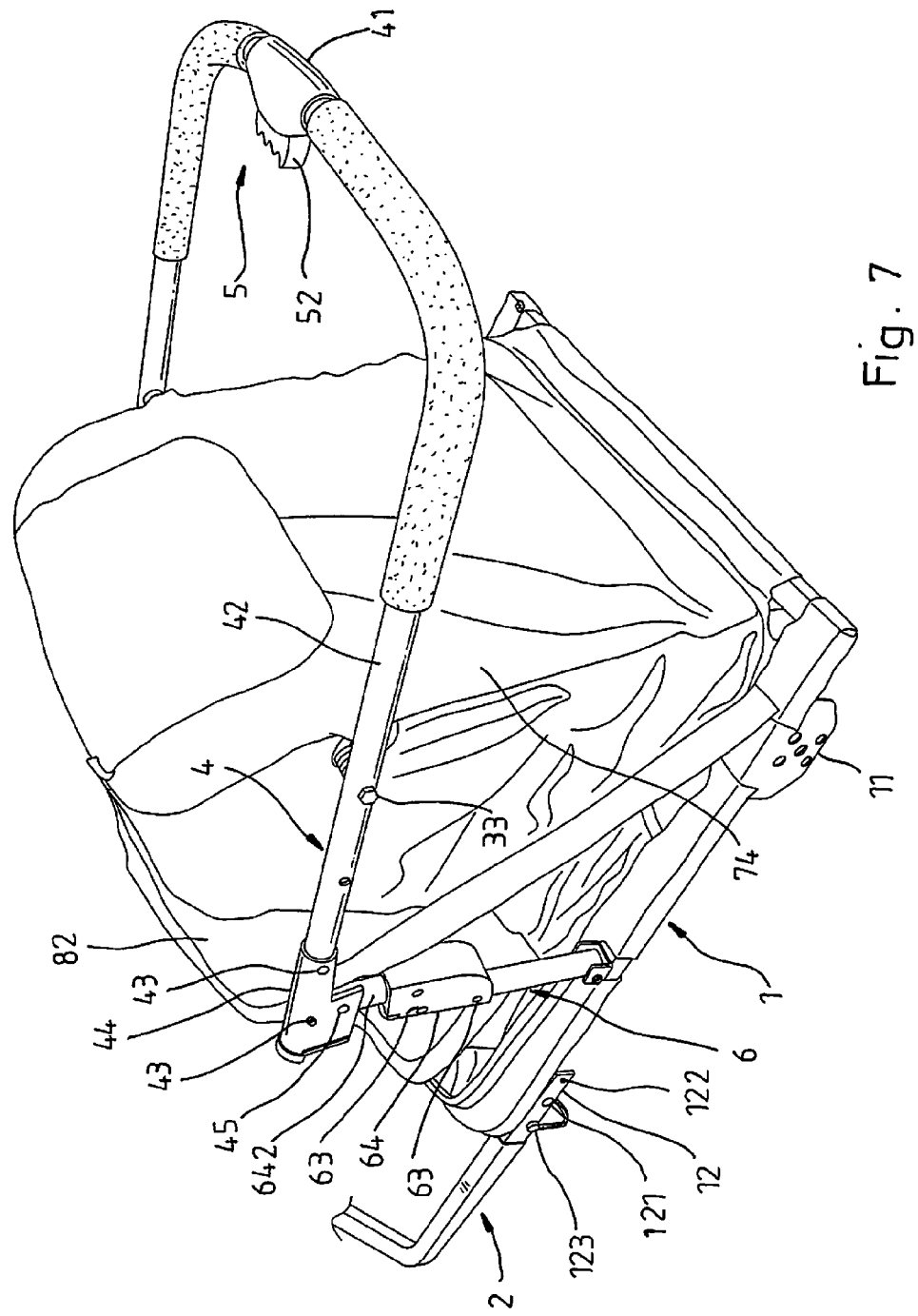
FIG. 7 illustrates the handle frame of the foldable baby trailer unlocked from the side frame bars and turned backwardly downwards.
Figure 8:
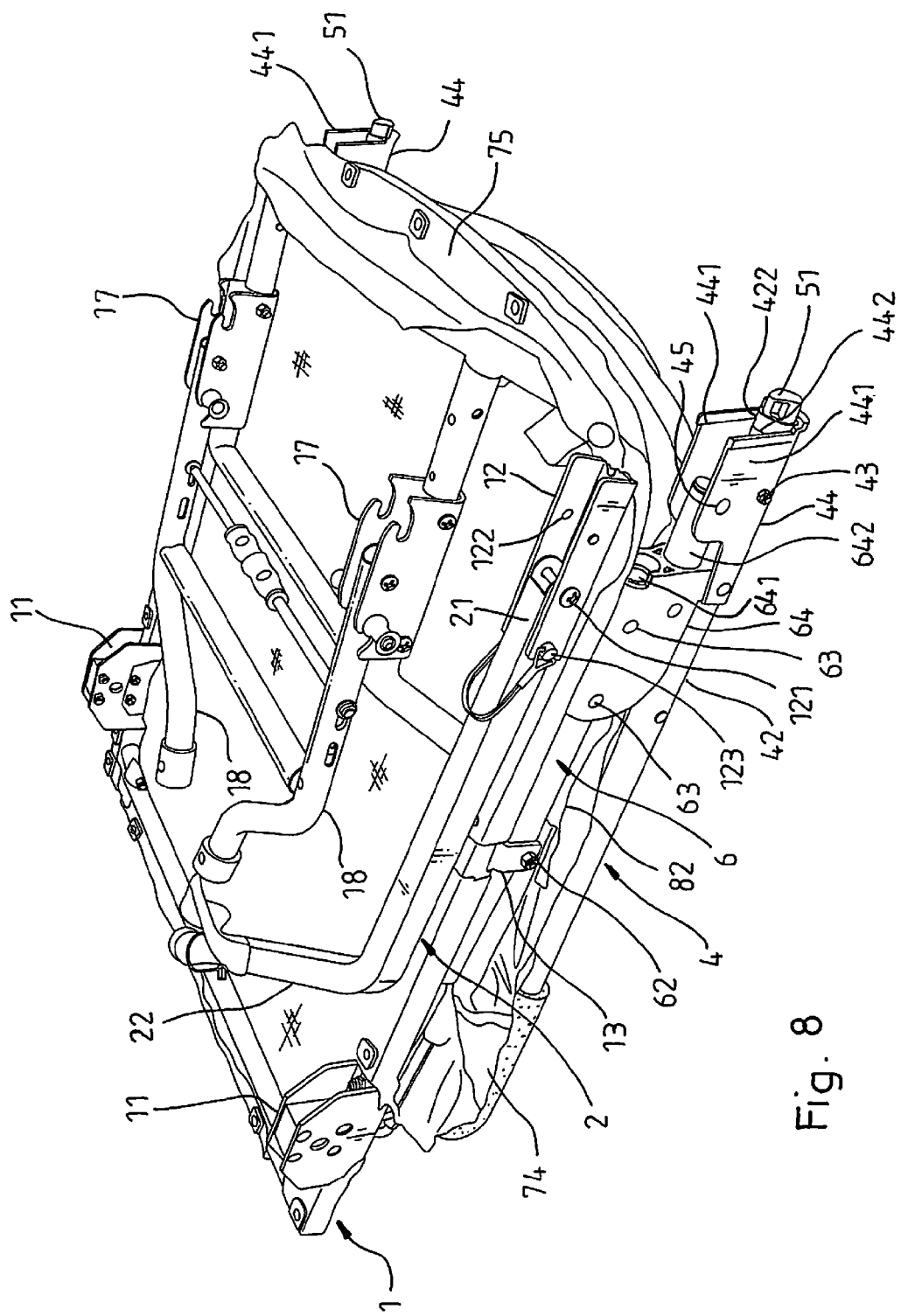
FIG. 8 illustrates the foldable baby trailer of the present invention collapsed.
Figure 9:
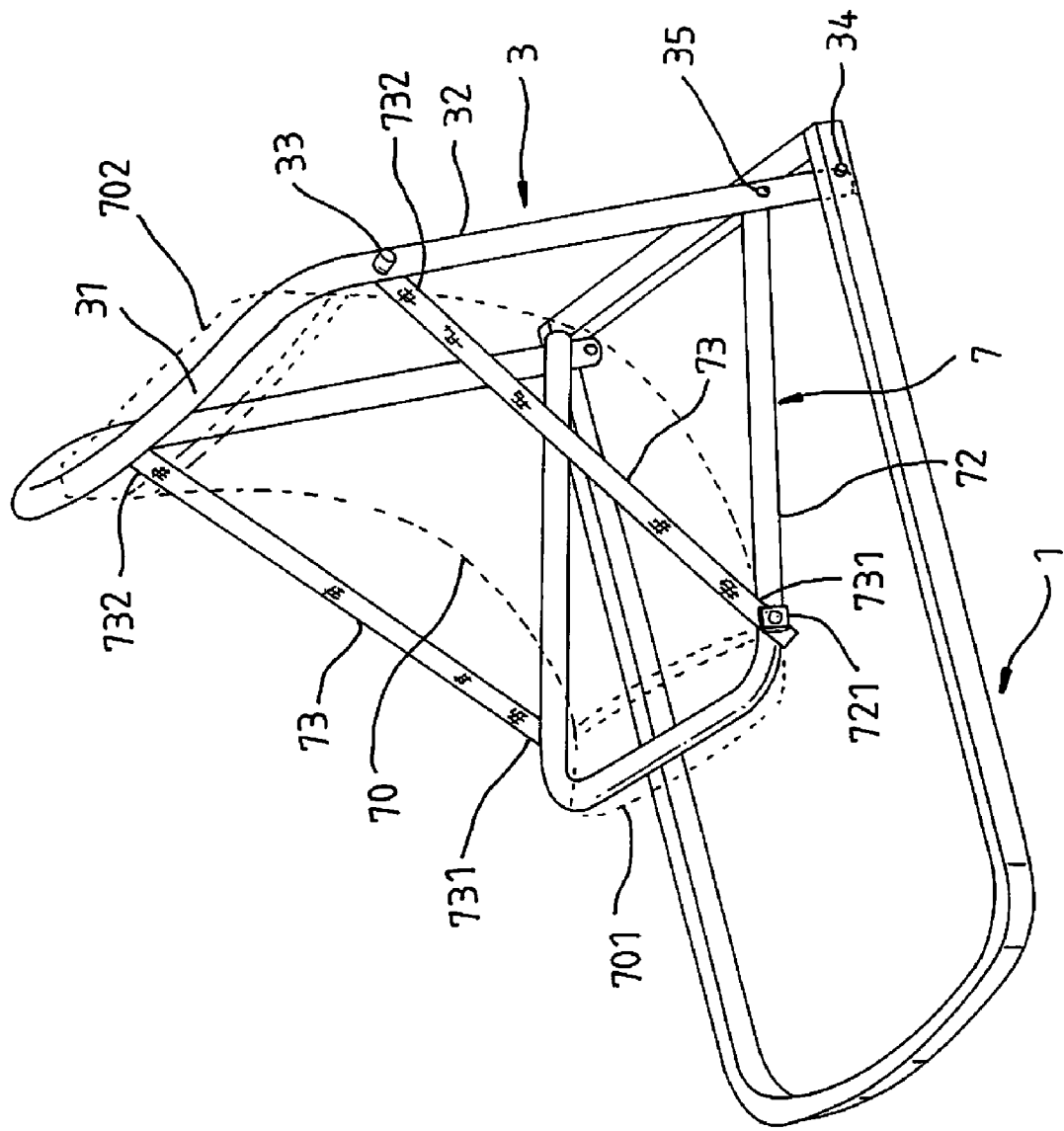
FIG. 9 is a schematic drawing of the present invention, showing the relative relationship among the bottom frame unit, the rear upright frame and the stretcher frame.

The stretcher frame 7 is a substantially U-shaped frame comprising a transverse front tube 71 and two longitudinal side tubes 72 respectively extending from the two distal ends of the transverse front tube 71. The two longitudinal side tubes 72 have the respective distal ends respectively pivotally connected to the vertical side frame tubes 32 of the rear upright frame 3 with a respective pivot 35. Further, a fabric seat panel 70 is connected between the stretcher frame 7 and the rear upright frame 3 for the sitting of a baby. As shown in FIGS. 6 and 9, the fabric seat panel 70 has a front side 701 fastened to the transverse front tube 71 of the stretcher frame 7, and a rear side 702 fastened to the transverse top rod 31 of the rear upright frame 3. Further, two flexible connection members 73 are respectively coupled between the two longitudinal side tubes 72 of the stretcher frame 7 and the vertical side frame tubes 32 of the rear upright frame 3 in such a manner that when the rear upright frame 3 is lifted from the bottom frame unit 1, the stretcher frame 7 is held in a sloping position with the transverse front tube 71 of the stretcher frame 7 spaced above the bottom frame unit 1 at a distance. Therefore, when a baby is sitting on the fabric seat panel 70, the legs of the baby will not touch the ground, avoiding an accident and assuring high level of safety. The flexible connection members 73 can be made of a nylon fabric or rope, each having one end 731 thereof respectively fixedly fastened to the longitudinal side tubes 72 of the stretcher frame 7 with a respective fastening member 721 and an opposite end 732 thereof respectively fastened to the vertical side frame tubes 32 of the rear upright frame 3 (see FIGS. 3 and 9).

The foldable baby trailer further comprises a canopy unit 8. The canopy unit 8 comprises two pivot holders 84 respectively bilaterally affixed to the bottom frame unit 1 near the rear side of the bottom frame unit 1, a plurality of substantially U-shaped canopy frame elements 81 that have the respective two opposite ends respectively pivoted to the pivot holders 84, a fabric canopy cover 74 and a shade 82 covered on the inverted disposed canopy frame elements 81 and moved with the canopy frame elements 81 between an extended condition (see FIG. 5) and a received condition (see FIG. 6), and a hook member 80 fixedly fastened to the front side 16 of the bottom frame unit 1 for securing the front side 811 of the frontmost U-shaped canopy frame element 81 when the canopy frame elements 81 are moved apart from one another to extend out of the fabric canopy cover 74 (see FIG. 4).

Further, two locating frames 17 are bilaterally located on the front side of the bottom frame unit 1, and two front wheel frame bars 18 are respectively pivoted to the locating frames 17 for carrying a respective front wheel (not shown). The two front wheel frame bars 18 can be turned relative to the bottom frame unit 1 between an extended position where the two front wheel frame bars 18 are extended out of the front side of the bottom frame unit 1 and a received position where the two front wheel frame bars 18 are received to the bottom side of the bottom frame unit 1 (see FIG. 4). When the two front wheel frame bars 18 are set in the extended position, the foldable baby trailer can be used as a handcart.

The aforesaid locating frames 17, front wheel frame bars 18 and the related front wheels are not the requisite components of the present invention. Further, using the locating frames 17, the front wheel frame bars 18 and the related front wheels to have the foldable baby trailer be used as a handcart is of the known techniques, no further detailed description in this regard is necessary.

Figure 5:
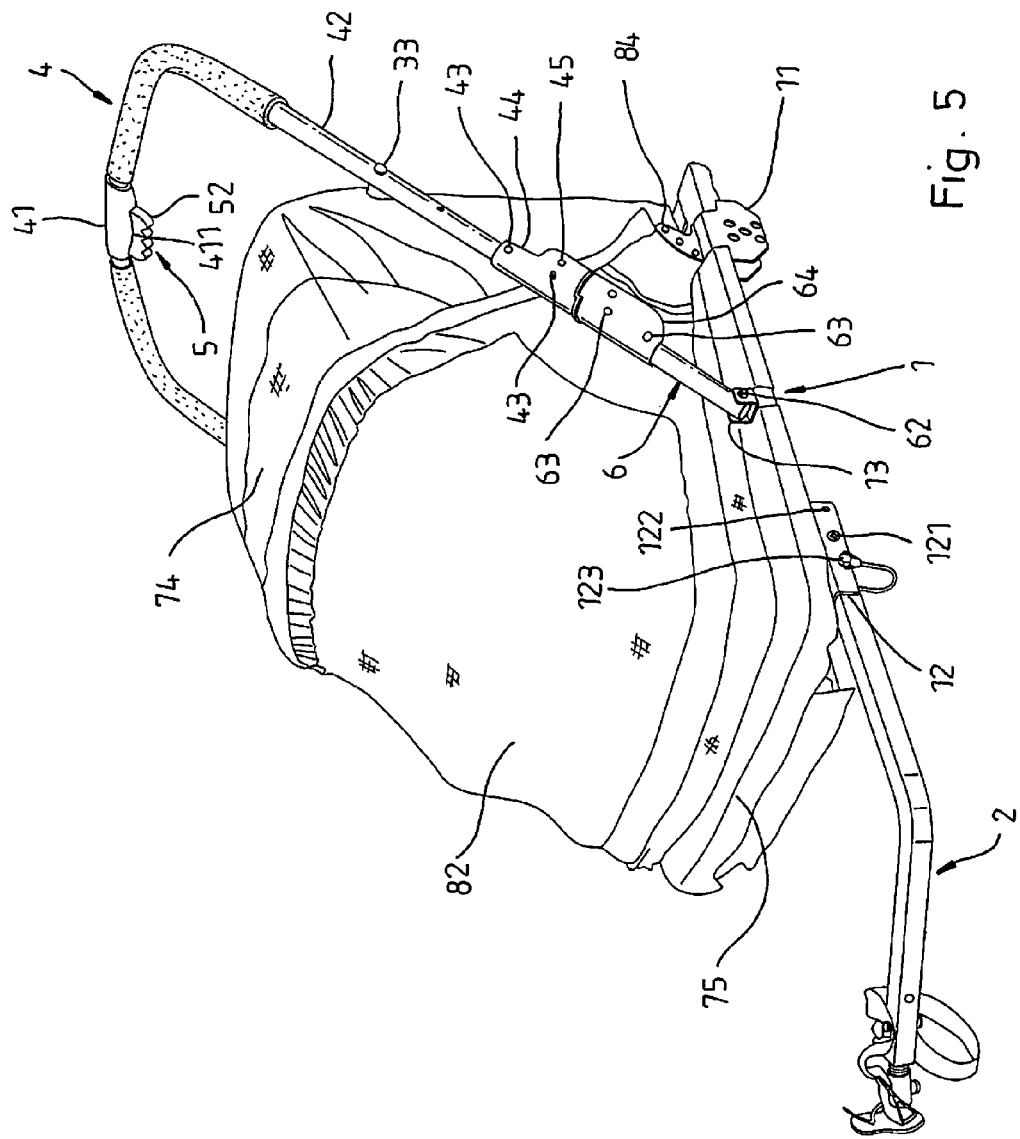
FIG. 5 illustrates the outer appearance of the foldable baby trailer according to the present invention.

Further, a bottom cover cloth 75 may be covered on the bottom frame unit 1. FIG. 5 illustrates the status of the foldable baby trailer after installation of the canopy cover 74 and shade 82, the fabric seat panel 70 and the bottom cover cloth 75. When wishing to collapse the foldable baby trailer, press the operating button 52 to pull the latches 51 backwards away from the respective latch holes 641 of the respective lower holder frame plates 64 toward the inside of the side frame tubes 42 of the handle frame 4, and then turn the handle frame 4 backwardly downwards (see FIG. 7) to force the rear upright frame 3, the side frame bars 6 and the stretcher frame 7 forwardly downwards, causing the rear upright frame 3, the side frame bars 6 and the stretcher frame 7 to be received to the top side of the bottom frame unit 1. At this time, the canopy frame elements 81 are forced forwardly downwards and received together to the top side of the bottom frame unit 1. At this time, the user can remove the lock pin 123 from the channel bar 12 and the trailer bar 2 to unlock the trailer bar 2, and then turn the trailer bar 2 from the extended position to the received position, and then fasten the lock pin 123 to the channel bar 12 and the trailer bar 2 to lock the trailer bar 2 in the received position (see FIG. 8). When wishing to extend the foldable baby trailer from the collapsed status to the extended operative status, reverse the aforesaid procedure.

When lifted the handle frame 4, the latches 51 are respectively engaged into the respective latch hole 641 of the respective lower holder frame plates 64, locking the foldable baby trailer in the extended position.

As indicated above, the invention has the following features and advantages:

1. When the foldable baby trailer is set in the extended operative status, the stretcher frame 7 is held in a sloping position with the transverse front tube 71 of the stretcher frame 7 spaced above the bottom frame unit 1 at a distance, and the legs of the baby sitting on the fabric seat panel 70 will not touch the ground, avoiding an accident and assuring high level of safety.

2. Simply by means of pressing the operating button 52 to disengage the latches 51 from the respective latch holes 641 of the respective lower holder frame plates 64 and then turning the handle frame 4 backwardly downwards to force the rear upright frame 3, the side frame bars 6 and the stretcher frame 7 forwardly downwards toward the top side of the bottom frame unit 1, the foldable baby trailer is collapsed.

3. The foldable baby trailer can easily be collapsed with the trailer bar received to the bottom side of the bottom frame unit 1, saving much storage space to facilitate delivery and packing.

What is claimed is:

1. A foldable baby trailer comprising:

a bottom frame unit, said bottom frame unit comprising two rear wheel holders bilaterally located on a rear side thereof and carrying a respective wheel, and a bottom channel bar longitudinally disposed at a bottom wall of one lateral side thereof;

a trailer bar, said trailer bar having a rear end thereof pivotally connected to a middle part of the bottom channel bar of said bottom frame unit with a pivot so that said trailer bar is turned bout relative to said bottom frame unit between an extended position and a received position and selectively lockable to the bottom channel bar of said bottom frame unit in one of the extended position and the received position with a lock pin;

a rear upright frame;

a handle frame, said handle frame comprising a tubular top grip and two side frame tubes respectively extended from two distal ends of said tubular top grip in a substantially parallel manner, said tubular top grip having an opening at a middle part thereof;

a folding control mechanism, said folding control mechanism comprising two latches respectively mounted in the side frame tubes of said handle frame, two spring members respectively mounted in the side frame tubes of said handle frame to impart a downward pressure to said latches and to force said latches out of the side frame tubes of said handle frame, an operating button mounted in the opening of said tubular top grip of said handle frame, and two cord members respectively inserted through the side frame tubes of said handle frame and connected between said operating button and said latches for enabling said latched to be pulled backwards into the inside of the side frame tubes of said handle frame when said operating button is pressed by an external force;

two side frame bars; and a stretcher frame unit;

wherein:

said bottom frame unit comprises two top lugs respectively located on a middle part of a top wall of each of two opposite lateral sides thereof;

said rear upright frame comprises a transverse top rod, and two vertical side frame tubes respectively downwardly extending from two distal ends of said transverse top rod and respectively pivoted to the two opposite lateral sides of said bottom frame unit near the rear side of the bottom frame unit with a respective pivot;

said two side frame tubes of said handle frame have a respective upper part respectively pivoted to top ends of the vertical side frame tubes of said rear upright frame with a respective pivot and a respective bottom end fixedly mounted with a respective upper holder frame plate, each said upper holder frame plate having two opposite sidewalls and a groove defined between the two opposite sidewalls for receiving one side frame tube of said handle frame;

said side frame bars have a respective bottom end respectively pivotally connected to the two top lugs of said bottom frame unit with a respective pivot and a respective top end fixedly mounted with a respective lower holder frame plate, each said lower holder frame plate comprising a latch hole for receiving one said latch of said folding control mechanism and a connection rod fixedly connected to and extended out of a top side thereof, said connection rod being pivotally connected to the upper holder frame plate at one side frame tube of said handle frame with a pivot;

said stretcher frame unit comprises stretcher frame, said stretcher frame comprising a transverse front tube and two longitudinal side tubes respectively extending from two distal ends of said transverse front tube, said two longitudinal side tubes having respective distal ends thereof respectively pivotally connected to the vertical side frame tubes of said rear upright frame with a respective pivot, and a fabric seat panel, said fabric seat panel having a front side fastened to said transverse front tube of said stretcher frame and a rear side fastened to the transverse top rod of said rear upright frame.

2. The foldable baby trailer as claimed in claim 1, wherein said stretcher frame unit further comprises two flexible connection members respectively connected between the two longitudinal side tubes of said stretcher frame and the vertical side frame tubes of said rear upright frame in such a manner that when said rear upright frame is lifted from said bottom frame unit, said stretcher frame is held in a sloping position to keep said transverse front tube of said stretcher frame spaced above said bottom frame unit at a predetermined distance.

* * * * *